June 15, 1937.  C. J. DOCKRAY ET AL  2,084,247
METHOD OF MAKING CHILLED METAL MOLD CASTINGS
Filed July 10, 1935   2 Sheets-Sheet 1

Inventors
Charles J. Dockray
Harry J. Dockray.

By Lacey & Lacey, Attorneys

June 15, 1937. C. J. DOCKRAY ET AL 2,084,247
METHOD OF MAKING CHILLED METAL MOLD CASTINGS
Filed July 10, 1935 2 Sheets-Sheet 2
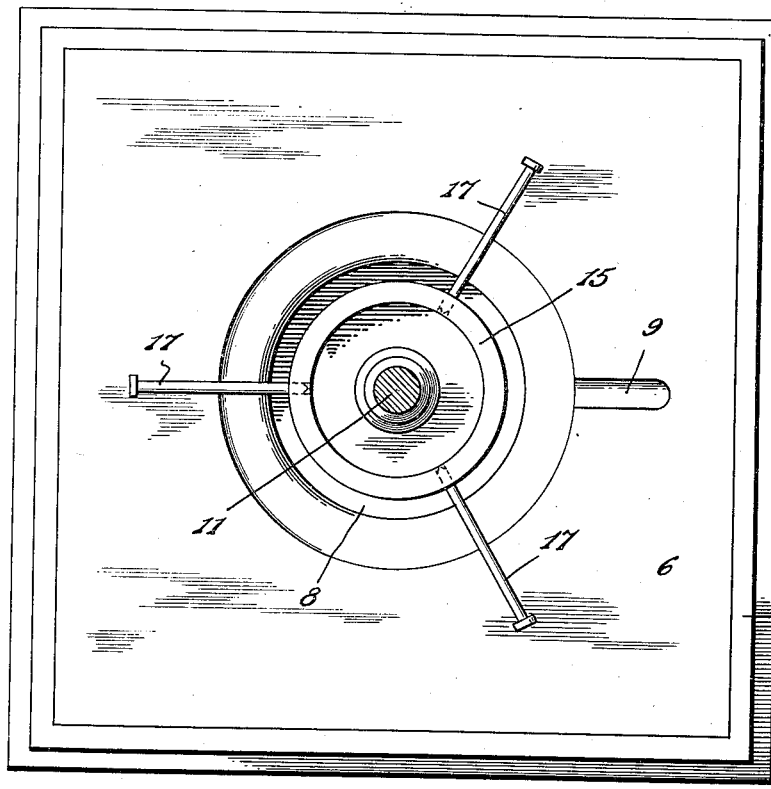
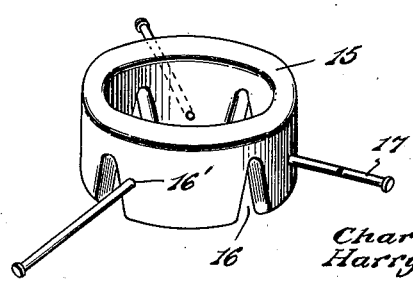
Inventors
Charles J. Dockray.
Harry J. Dockray.
By Lacy & Lacy, Attorneys Patented June 15, 1937

2,084,247

UNITED STATES PATENT OFFICE 2,084,247

METHOD OF MAKING CHILLED METAL MOLD CASTINGS

Charles J. Dockray and Harry J. Dockray, Zanesville, Ohio

Application July 10, 1935, Serial No. 30,709

3 Claims. (Cl. 22—200)

This invention relates to a novel method of making chilled metal mold castings of that general class shown and described in our co-pending application, Serial No. 146, filed in the United States Patent Office on the 2nd day of January, 1935 and of which the present application is a continuation in part.

Heretofore, in the art to which this invention pertains, considerable difficulty has been experienced in obtaining a uniform density or fineness of the grain of the metal around the walls of the sand mold cavity during the pouring operation, this being due to the fact that when the metal is poured into the sand mold, the molten metal at the bottom of the mold tends to heat the chill, with the result that the metal around the upper portion of the sand mold cavity is often of an open grain or porous nature instead of presenting a dense close texture.

Such flaws or defects in the metal are seldom detected until the glass mold is reamed or finished preparatory for use, and as it is essential that the walls of the glass mold cavity be free from pores or pits to produce the best results, it follows that such defective castings must be discarded which not only entails a loss of time but also the expense incident to casting and finishing a replacement mold.

Furthermore, when the walls of the glass mold are relatively thin, the heat from molten glass soon causes the mold to become excessively hot which necessitates either cooling the mold at frequent intervals or replacing the heated mold with a new one.

The object of the invention is to provide a new and novel method of making chilled metal mold castings by means of which the objectionable features referred to are overcome and by the practice of which method the walls of the mold cavity will present a uniformly dense fine grain throughout the entire effective area thereof and the walls of the casting will be of sufficient thickness or mass volume to take up and uniformly distribute the heat throughout the mass of metal during the molding of glass articles so as to increase the effective life of the mold. In carrying the method into effect, an auxiliary chill is provided which is molded or anchored in the metal in the sand mold cavity during the casting operation and which prevents overheating of the main chill, thereby permitting proper chilling of the metal at the upper, as well as the lower portion of the sand mold so that the chilled metal surfaces of the glass mold will be of uniform density and free from superficial pits or pores.

In the accompanying drawings forming a part of this specification in which similar numerals of reference indicate corresponding parts in all the figures of the drawings, Figure 1 is a vertical sectional view of a molding apparatus employed in carrying out the improved method.

Figure 2 is a top plan view looking at the apparatus on the line 2—2 of Figure 1.

Figure 3 is a perspective view of the auxiliary chill detached.

Figure 1:
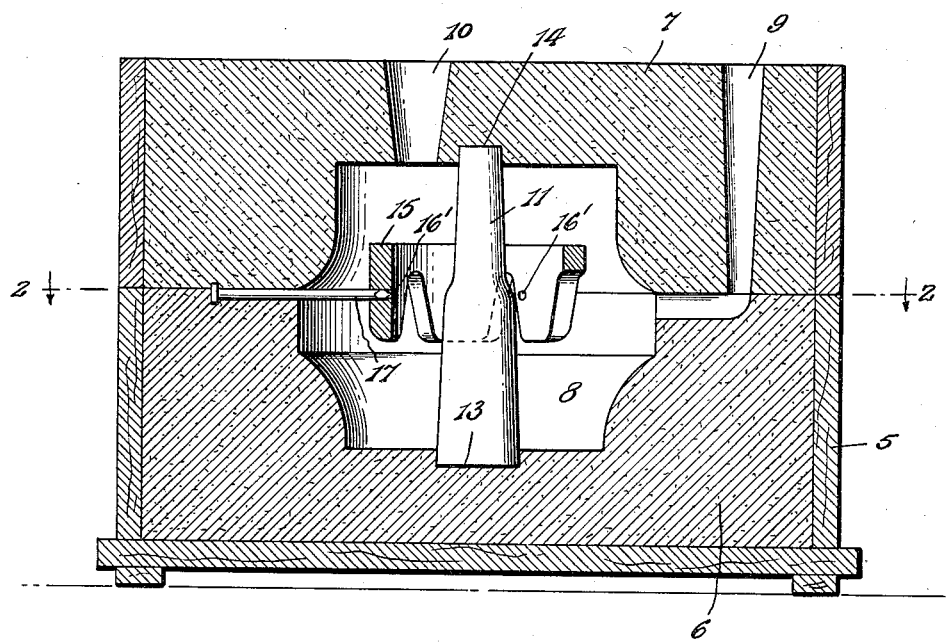
Figure 4:
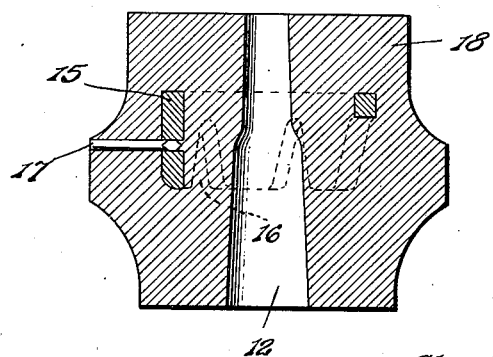
Figure 4 is a vertical sectional view of the completed mold or casting.

In carrying the present invention into effect, we provide a molding flask 5 including a drag 6 and a cope 7, the parts being freely separable and adapted to be fastened together in any suitable manner during the casting operation. After the flask has been set up, a pattern, not shown, of the size and configuration of the mold or casting to be produced is placed within the sand and subsequently withdrawn to produce a shaping cavity 8 adapted to receive molten metal through a gate 9, the cope 7 being provided with the usual headers 10 to allow for shrinkage of the metal during the casting operation. Disposed within the cavity 8 is a main or central chill 11 of a shape and size conforming to the shape and size of the cavity 12 to be formed in the casting, and the upper and lower ends of this central chill are preferably seated in centering sockets 13 and 14 so as to prevent displacement of the chill when pouring the molten metal. Surrounding the main chill, preferably near the upper portion thereof, and spaced laterally therefrom, is an annular auxiliary chill 15, having its lower edge cut away to form recesses 16, preferably substantially V-shaped, and this auxiliary chill 15 serves to prevent overheating of the main chill by absorbing a portion of the heat from the molten metal so as to maintain the central chill 11 at a uniform cool temperature throughout its entire height and thus produce a fine close grain at the walls of the glass mold cavity 12. The auxiliary chill 15 may be suspended within the shaping cavity 8 in any suitable manner, as, for instance, by lugs on the auxiliary chill, but it is preferred to provide said auxiliary chill with spaced transverse openings 16' adapted to receive chaplets or anchoring pins 17 which latter or the lugs may, if desired, rest on the sand at the junction of the drag and cope of the flask, as best shown in Fig. 1 of the drawings.

In operation, the main or central chill 11 and the outer or auxiliary chill 15 are positioned within the shaping cavity 8, as best shown in Figure 1 of the drawings, after which the molten metal is introduced through the gate 9 in the usual manner. As the molten metal fills the bottom of the cavity 8, a portion of the heat from the molten metal will be absorbed by the auxiliary chill 15 so that the walls of the glass mold at the cavity 12 will be uniformly chilled throughout their entire effective area and thus cause the metal at said walls to present a fine close or dense grain necessary to obtain the best results in molding glass articles. During the pouring operation the molten metal will fill the V-shaped recesses 16 in the auxiliary chill so that when the casting is completed and the finished mold is used for fashioning glass objects, the heat from the molten glass will pass through the cast iron within said recesses and thus insure a uniform distribution of heat throughout the entire mass of metal constituting the casting.

It will thus be seen that this auxiliary chill 15 prevents overheating of the main chill and consequently prevents the metal around the walls of the glass mold chamber 12 from becoming porous or pitted, which generally occurs where but a single chill is employed. In other words, the auxiliary chill 15 prevents premature heating of the upper portion of the main chill and thus insures an even close grain texture of the metal throughout the entire height of the glass mold chamber. After the pouring operation, the flask is disassembled and the completed casting, indicated at 18, removed therefrom leaving the auxiliary chill 15 embedded in the casting and forming a permanent part thereof.

The pins, lugs or other suspending elements 17 are then cut or otherwise severed flush with the outer surface of the casting 18 and the latter shipped to the glass factory where the cavity 12 is reamed out or finished.

It is impossible to determine whether the metal at the walls of the glass mold cavity is porous or otherwise defective until the mold cavity is reamed or otherwise finished as said pores are exposed only during the finishing operation and should the metal at the molding surface of any of the castings be more or less porous, said castings cannot be used and are a total loss, and the present invention obviates this loss and the expense incident thereto.

Attention is here called to the fact that the walls of the glass mold or casting 18 are relatively thick and massive, while the auxiliary chill 15 forms a permanent part of said glass mold or casting so that when molten glass is introduced within the mold cavity 12, the heat from the glass will pass through the cast iron within the openings 16 in the chill 15 and be uniformly distributed throughout the entire mass of metal and thus permit the use of the mold for an indefinite period without shutting down operations to effect cooling thereof or replacement of the molds due to excessive heat conditions.

It will thus be seen that the auxiliary chill 15 not only serves to prevent porosity of the metal but also serves to reinforce the finished glass mold or casting and insures an even distribution of heat throughout the mass of metal constituting the mold during the molding of tumblers, bottles or other glassware.

It will, of course, be understood that the auxiliary chills may be made in different shapes and sizes according to the specific purpose for which the mold or casting is to be employed and that said auxiliary chills may be suspended within the flask in any suitable manner which will insure proper centering of the auxiliary chill with respect to the main chill, the essential feature of the invention residing in the novel process or method by the practice of which the auxiliary chill prevents overheating of the main chill and thus insures a dense and satisfactory close grain in the casting and which auxiliary chill forms a permanent part of and reinforcement for the finished glass mold or casting.

Having thus described the invention, what is claimed as new is:

1. The method of making a reinforced chilled metal mold casting for forming glass objects which consists in forming a shaping cavity in molding sand having a laterally enlarged intermediate portion, placing a main chill centrally within the shaping cavity, surrounding the main chill at said enlarged portion of the cavity with an auxiliary chill of appreciably less height than the main chill and having cut-out portions extending entirely therethrough, holding said auxiliary chill in spaced relation to the main chill by supporting members embedded in the sand walls of the shaping cavity to provide an unobstructed space between the main chill and auxiliary chill, and pouring metal into the shaping cavity in contact with the sand walls thereof to fill said space and entirely cover the auxiliary chill and to cause a portion of the metal to enter and completely fill the cut-out portions in said auxiliary chill.

2. The method of making a reinforced chilled metal mold casting having an intermediate exterior circumferential thickened portion which consists in forming a shaping cavity directly in molding sand having a laterally enlarged intermediate portion, placing a main chill centrally and vertically within the shaping cavity, surrounding the main chill at the enlarged portion of the cavity with a scalloped annular auxiliary chill of appreciably less height than the main chill, holding the auxiliary chill in spaced relation to the main chill by supporting members entirely separate from the main chill and having their outer ends embedded in the sand walls of the shaping cavity at the enlarged portion thereof to provide an unobstructed annular space between the main chill and the auxiliary chill pouring metal into the shaping cavity to cause said metal to fill said annular space and completely surround the auxiliary chill and fill the scallops therein, and after the casting is formed severing the projecting ends of the supporting members substantially flush with the outer wall of the casting at the enlargement thereof.

3. The method of making a reinforced chilled metal mold casting for forming glass objects which consists in forming a shaping cavity in molding material, placing a main chill substantially centrally within the shaping cavity, surrounding the upper portion of the glass molding surface of the main chill with an auxiliary chill of appreciably less height than the main chill and having cut-out portions extending entirely therethrough, holding said auxiliary chill in spaced relation to the main chill to provide an unobstructed space between the main chill and auxiliary chill, and pouring metal into the shaping cavity in contact with the walls thereof to fill said space and entirely cover the auxiliary chill and to cause a portion of the metal to enter and completely fill the cut-out portions in said auxiliary chill.

CHARLES J. DOCKRAY.
HARRY J. DOCKRAY.